United States Patent
Hatakeyama (10) Patent No.: US 10,211,752 B2
(45) Date of Patent: Feb. 19, 2019

(54) DIRECT-CURRENT POWER SUPPLY DEVICE AND REFRIGERATION CYCLE-APPLIED APPARATUS

(71) Applicant: Mitsubishi Electric Corporation, Tokyo (JP)

(72) Inventor: Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/780,297

(22) PCT Filed: Feb. 25, 2016

(86) PCT No.: PCT/JP2016/055696
§ 371 (c)(1),
(2) Date: May 31, 2018

(87) PCT Pub. No.: WO2017/145339
PCT Pub. Date: Aug. 31, 2017

(65) Prior Publication Data
US 2018/0358906 A1    Dec. 13, 2018

(51) Int. Cl.
*H02M 7/12* (2006.01)
*H02M 7/219* (2006.01)
(Continued)

(52) U.S. Cl.
CPC ............ *H02M 7/219* (2013.01); *F25D 29/00* (2013.01); *H02J 7/0052* (2013.01); *H02M 1/12* (2013.01); *H02M 1/4225* (2013.01); *H02J 7/345* (2013.01)

(58) Field of Classification Search
None
See application file for complete search history.

(56) References Cited

U.S. PATENT DOCUMENTS

| 6,181,583 B1 | 1/2001 | Okui et al. |
| 2004/0212944 A1* | 10/2004 | Tanzawa ................ F02D 41/20 |
| | | 361/160 |

(Continued)

FOREIGN PATENT DOCUMENTS

| JP | 2000-278955 A | 10/2000 |
| JP | 2012-170215 A | 9/2012 |
| WO | 2015/186229 A1 | 12/2015 |

OTHER PUBLICATIONS

International Search Report of the International Searching Authority dated May 10, 2016 for the corresponding international application No. PCT/JP2016/055696 (and English translation).

*Primary Examiner* — Bentsu Ro
(74) *Attorney, Agent, or Firm* — Posz Law Group, PLC (57) ABSTRACT

A direct-current power supply device includes a first capacitor and a second capacitor connected in series between output terminals to a load, a charging unit including a first switching element that switches charging and non-charging of the first capacitor, a second switching element that switches charging and non-charging of the second capacitor, a first backflow preventing element that prevents charged electric charges of the first capacitor from backflowing to the first switching element, and a second backflow preventing element that prevents charged electric charges of the second capacitor from backflowing to the second switching element, and a control unit that controls the first backflow preventing element to an ON state at timing when the charging of the first capacitor is started and controls the second backflow preventing element to the ON state at timing when the charging of the second capacitor is started.

16 Claims, 7 Drawing Sheets

(51) Int. Cl.
*H02M 1/12* (2006.01)
*H02J 7/00* (2006.01)
*F25D 29/00* (2006.01)
*H02M 1/42* (2007.01)
*H02J 7/34* (2006.01)

(56) References Cited

U.S. PATENT DOCUMENTS

2007/0296377 A1* 12/2007 Hashimoto ........... H02J 7/0052
    320/159
2013/0271096 A1   10/2013 Inagaki
2013/0342139 A1* 12/2013 Shimomugi .......... H02M 7/066
    318/400.3
2016/0248352 A1*  8/2016 Shinomoto ............. H02M 1/32
2016/0329846 A1* 11/2016 Shimomugi .......... H02M 3/158
2017/0153051 A1   6/2017 Hatakeyama et al.

* cited by examiner

| STATE | A | B | C | D |
|---|---|---|---|---|
| CIRCUIT OPERATION | | | | |
| SW1 | OFF | ON | OFF | ON |
| SW2 | OFF | OFF | ON | ON |
| SW3 | ON | OFF | ON | OFF |
| SW4 | ON | ON | OFF | OFF |

FIG.4

| VOLTAGE CONTROL OPERATION | STATE | | | | | | | | | | | |
|---|---|---|---|---|---|---|---|---|---|---|---|---|
| FULL-WAVE RECTIFYING OPERATION | A | A | A | A | A | A | A | A | A | A | A | A |
| BOOSTING OPERATION a | B | A | C | A | B | A | C | A | B | A | C | A |
| BOOSTING OPERATION b | B | C | B | C | B | C | B | C | B | C | B | C |
| BOOSTING OPERATION c | D | B | D | C | D | B | D | C | D | B | D | C |

DIRECT-CURRENT POWER SUPPLY DEVICE AND REFRIGERATION CYCLE-APPLIED APPARATUS

CROSS REFERENCE TO RELATED APPLICATION

This application is a U.S. national stage application of International Patent Application No. PCT/JP2016/055696 filed on Feb. 25, 2016, the disclosure of which is incorporated herein by reference.

TECHNICAL FIELD

The present invention relates to a direct-current power supply device and a refrigeration cycle-applied apparatus including the direct-current power supply device.

BACKGROUND

There has been a technology for, in a power supply device connected to a single-phase power supply, operating a switching element once or more in synchronization with a power-supply half cycle to expand a conduction angle of an input current to improve a power factor and reduce harmonic components of the input current (e.g., Patent Literature 1).

PATENT LITERATURE

Patent Literature 1: Japanese Patent Application Laid-Open No. 2000-278955

In the power supply device described in Patent Literature 1, when operation for not operating two switching elements in light-load operation in which a high voltage output is unnecessary, an electric current flows to two backflow-preventing rectifying elements and a conduction loss occurs. In particular, in an apparatus having a high time ratio of low-output operation such as an air conditioner, there has been a problem in that the influence of the conduction loss that occurs in the backflow-preventing rectifying elements cannot be neglected.

SUMMARY

The present invention has been devised in view of the above, and an object of the present invention is to obtain a direct-current power supply device capable of reducing a conduction loss and realizing high efficiency.

To solve the problem and achieve the object, a direct-current power supply device according to the present invention includes a first capacitor and a second capacitor connected in series between output terminals to a load. The direct-current power supply device includes: a charging unit including a first switching element to switch charging and non-charging of the first capacitor, a second switching element to switch charging and non-charging of the second capacitor, a first backflow preventing element to prevent charged electric charges of the first capacitor from backflowing to the first switching element, and a second backflow preventing element to prevent charged electric charges of the second capacitor from backflowing to the second switching element; and a control unit to control the first backflow preventing element to an ON state at timing when the charging of the first capacitor is started and control the second backflow preventing element to the ON state at timing when the charging of the second capacitor is started.

The direct-current power supply device according to the present invention achieves an effect that it is possible to reduce a conduction loss and realize high efficiency.

DETAILED DESCRIPTION

Direct-current power supply devices and refrigeration cycle-applied apparatuses according to embodiments of the present invention are explained in detail below with reference to the drawings. Note that the present invention is not limited by the embodiments.

First Embodiment

Figure 1:
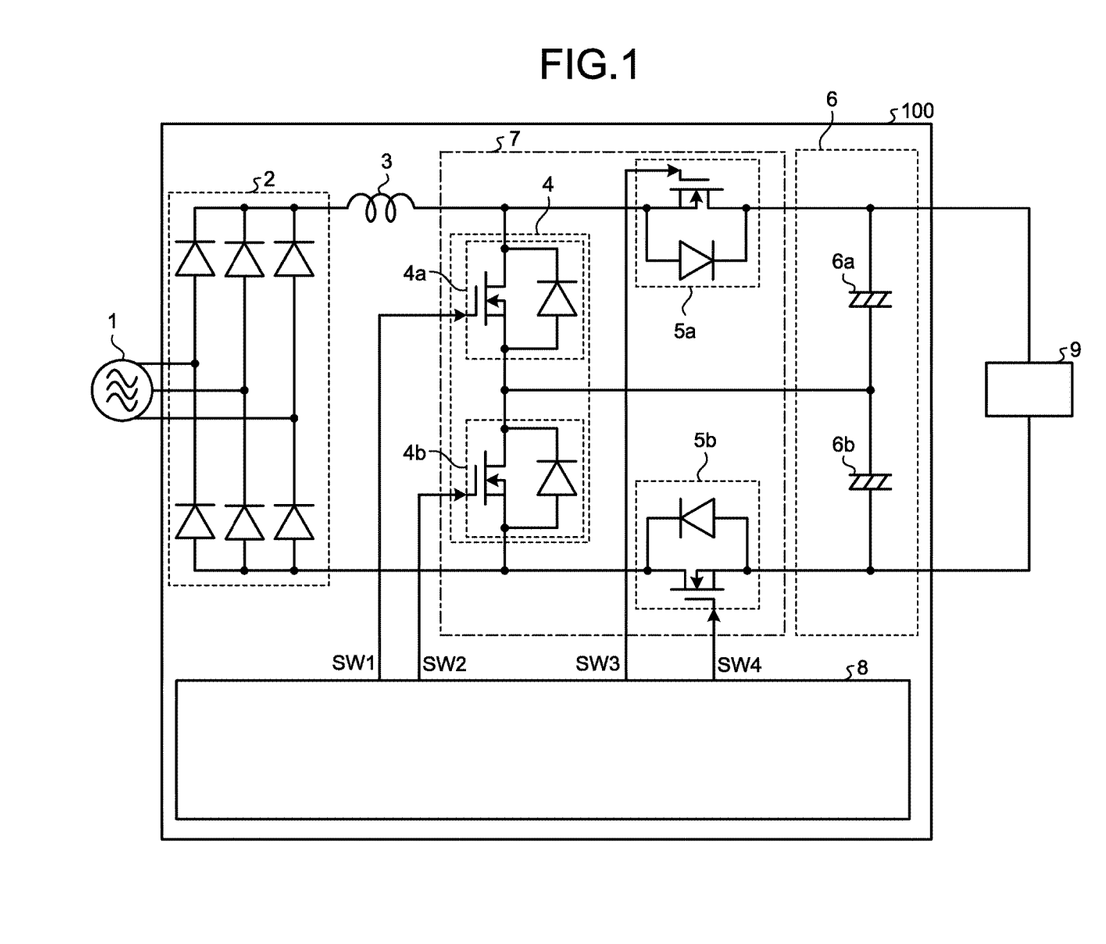
FIG. 1 is a diagram illustrating a configuration example of a direct-current power supply device according to a first embodiment.

FIG. 1 is a diagram illustrating a configuration example of a direct-current power supply device according to a first embodiment. As illustrated in FIG. 1, a direct-current power supply device 100 according to the first embodiment is configured to convert a three-phase alternating current supplied from an alternating-current power supply 1 into a direct current and supply the direct current to a load 9. In this embodiment, as the load 9, for example, an inverter load that drives a compressor motor used in a refrigeration cycle-applied apparatus is assumed. However, it goes without saying that the load 9 is not limited to this.

Figure 2:
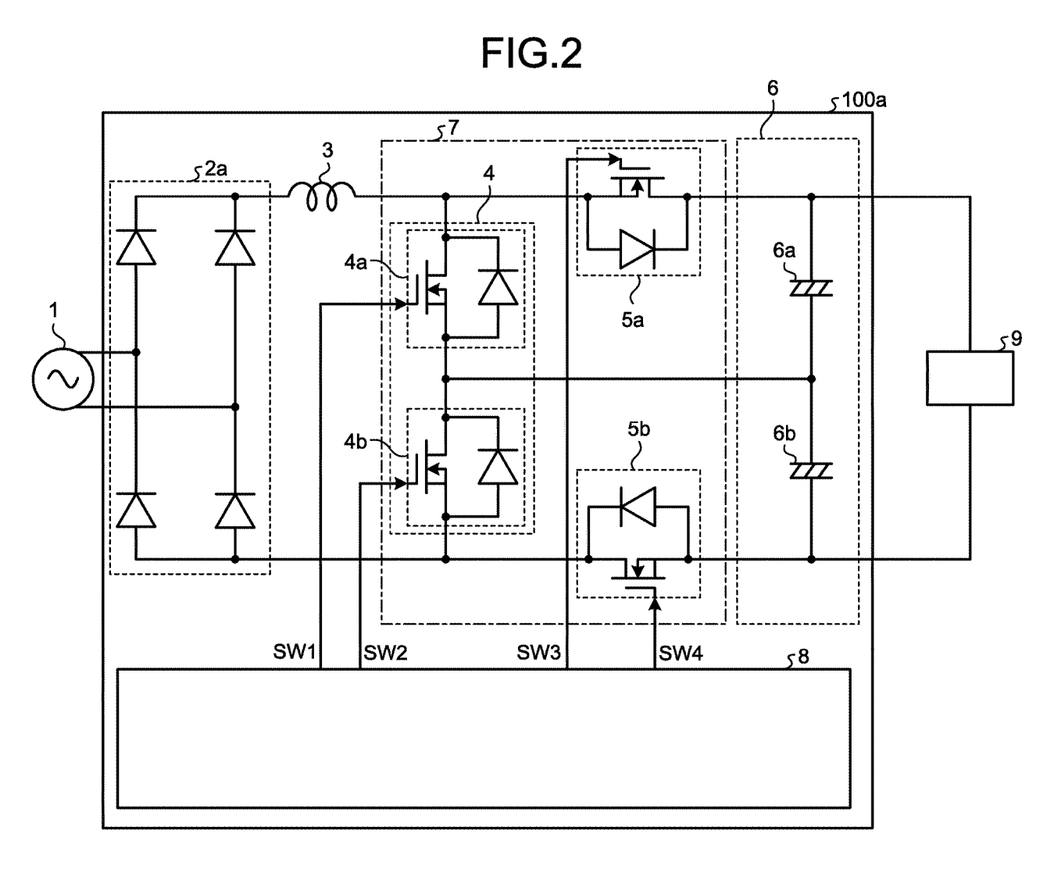
FIG. 2 is a diagram illustrating another configuration example of the direct-current power supply device according to the first embodiment.

The direct-current power supply device 100 includes a rectifier circuit 2 that rectifies a three-phase alternating current supplied from the alternating-current power supply 1, a reactor 3 connected to an output side of the rectifier circuit 2, a first capacitor 6a and a second capacitor 6b connected in series between output terminals to the load 9, a charging unit 7 that selectively charges one or both of the first capacitor 6a and the second capacitor 6b, and a control unit 8 that controls the charging unit 7. Note that, in the example illustrated in FIG. 1, the rectifier circuit 2 is configured as a three-phase full-wave rectifier circuit in which six rectifier diodes are connected in a full-bridge manner. In the example illustrated in FIG. 1, an example is illustrated in which the reactor 3 is connected to the output side of the rectifier circuit 2. However, a configuration can be adopted in which reactors are connected to phases on an input side of the rectifier circuit 2. When a single-phase alternating current is supplied from the alternating-current power supply 1, the configuration of the direct-current power supply device is a configuration illustrated in FIG. 2. FIG. 2 is a diagram illustrating another configuration example of the direct-current power supply device according to the first embodiment. In a direct-current power supply device 100a illustrated in FIG. 2, the rectifier circuit 2 of the direct-current power supply device 100 is replaced with a rectifier circuit 2a. The rectifier circuit 2a is a single-phase full-wave rectifier circuit in which four rectifier diodes are connected in a full-bridge manner. In the example illustrated in FIG. 2, an example is illustrated in which the reactor 3 is connected to an output side of the rectifier circuit 2a. However, a configuration can be adopted in which reactors are connected to an input side of the rectifier circuit 2a.

Note that the rectifier circuits 2 and 2a are general rectifier circuits. Therefore, explanation of the rectifier circuits 2 and 2a is omitted. In this embodiment, the alternating-current power supply 1 supplies a three-phase alternating current, that is, the direct-current power supply device 100 illustrated in FIG. 1 is explained. However, the operation of the direct-current power supply device 100a illustrated in FIG. 2 is the same.

In the direct-current power supply device 100, the charging unit 7 includes a first switching element 4a that switches charging and non-charging of the first capacitor 6a, a second switching element 4b that switches charging and non-charging of the second capacitor 6b, a first backflow preventing element 5a that prevents charged electric charges of the first capacitor 6a from backflowing to the first switching element 4a, and a second backflow preventing element 5b that prevents charged electric charges of the second capacitor 6b from backflowing to the second switching element 4b.

The middle point of a series circuit 4 including the first switching element 4a and the second switching element 4b and the middle point of a series circuit 6 including the first capacitor 6a and the second capacitor 6b are connected. The first backflow preventing element 5a is connected in a forward direction from a collector of the first switching element 4a toward a connection point of the first capacitor 6a and the load 9. The second backflow preventing element 5b is connected in the forward direction from a connection point of the second capacitor 6b and the load 9 toward an emitter of the second switching element 4b.

As the first capacitor 6a and the second capacitor 6b, capacitors having the same capacitance are respectively used. As the first switching element 4a and the second switching element 4b, a semiconductor element such as a power transistor, a power Metal-Oxide-Semiconductor Field-Effect Transistor (MOSFET), or an Insulated Gate Bipolar Transistor (IGBT) is used. As the first backflow preventing element 5a and the second backflow preventing element 5b, a MOSFET, which is a switching element, is used. However, it goes without saying that other backflow preventing elements are used without any problem.

The control unit 8 controls a direct-current voltage supplied to the load 9 by individually controlling the elements of the charging unit 7, that is, the first switching element 4a, the second switching element 4b, the first backflow preventing element 5a, and the second backflow preventing element 5b to switch the elements to an ON state or an OFF state. In the following explanation, control for switching the elements to the ON state is referred to as ON control and control for switching the elements to the OFF state is referred to as OFF control. The switching control of the elements of the charging unit 7 by the control unit 8 is explained below with reference to FIG. 1, FIG. 3, and FIG. 4.

Figure 3:
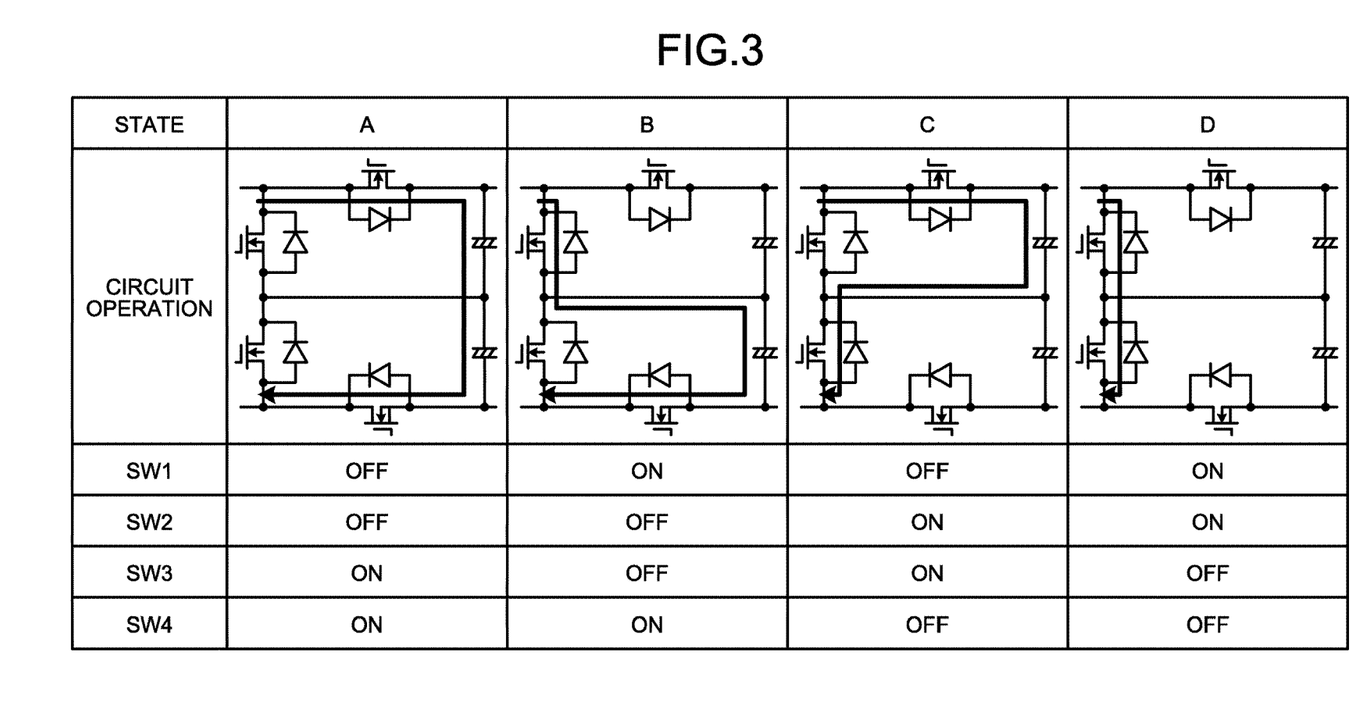
FIG. 3 is a diagram illustrating a switching control state in the direct-current power supply device according to the first embodiment.

FIG. 3 is a diagram illustrating switching control states in the direct-current power supply device according to the first embodiment. Note that, in an example illustrated in FIG. 3, the elements of the charging unit 7, the first capacitor 6a, and the second capacitor 6b are illustrated in a field of circuit operation. However, signs of these components are omitted. The elements of the charging unit 7 are controlled by the control unit 8.

A state A illustrated in FIG. 3 indicates a state in which the first switching element 4a and the second switching element 4b are OFF-controlled and the first backflow preventing element 5a and the second backflow preventing element 5b are ON-controlled. In the state A, charging of the first capacitor 6a and the second capacitor 6b is performed via the first backflow preventing element 5a and the second backflow preventing element 5b.

A state B illustrated in FIG. 3 indicates a state in which the first switching element 4a and the second backflow preventing element 5b are ON-controlled and the second switching element 4b and the first backflow preventing element 5a are OFF-controlled. In the state B, only charging of the second capacitor 6b is performed.

A state C illustrated in FIG. 3 indicates a state in which the second switching element 4b and the first backflow preventing element 5a are ON-controlled and the first switching element 4a and the second backflow preventing element 5b are OFF-controlled. In the state C, only charging of the first capacitor 6a is performed.

A state D illustrated in FIG. 3 indicates a state in which the first switching element 4a and the second switching element 4b are ON-controlled and the first backflow preventing element 5a and the second backflow preventing element 5b are OFF-controlled. In the state D, charging of both of the first capacitor 6a and the second capacitor 6b is not performed.

As illustrated in FIG. 3, in the direct-current power supply device 100, the first switching element 4a and the first backflow preventing element 5a are ON-controlled and OFF-controlled in an inverse relation to each other. Similarly, the second switching element 4b and the second backflow preventing element 5b are ON-controlled and OFF-controlled in an inverse relation to each other. That is, when OFF-controlling the first switching element 4a to charge the first capacitor 6a, the control unit 8 ON-controls the first backflow preventing element 5a. When ON-controlling the first switching element 4a to stop the charging of the first capacitor 6a, the control unit 8 OFF-controls the first backflow preventing element 5a. When OFF-controlling the second switching element 4b to charge the second capacitor 6b, the control unit 8 ON-controls the second backflow preventing element 5b. When ON-controlling the second switching element 4b to stop the charging of the second capacitor 6b, the control unit 8 OFF-controls the second backflow preventing element 5b.

In this way, if states of the first switching element 4a and the second switching element 4b are determined, states of the first backflow preventing element 5a and the second backflow preventing element 5b are also determined. Therefore, in the following explanation, for simplification, only the state of the first switching element 4a and the state of the second switching element 4b are illustrated. Description is omitted concerning the state of the first backflow preventing element 5a and the state of the second backflow preventing element 5b. Note that the first backflow preventing element 5a and the second backflow preventing element 5b include diodes in switching elements configured therein. Therefore, in the states A to C, the ON-controlled first backflow preventing element 5a and second backflow preventing element 5b are OFF-controlled, there is no problem as operation because an electric current flows to the diodes. However, a peculiar effect is obtained by ON-controlling the first backflow preventing element 5a and the second backflow preventing element 5b. The effect obtained by adopting a configuration for ON-controlling the first backflow preventing element 5a and the second backflow preventing element 5b is explained below.

The direct-current power supply device 100 according to this embodiment switches the states illustrated in FIG. 3 as appropriate to thereby control a direct-current voltage supplied to the load 9.

Figure 4:
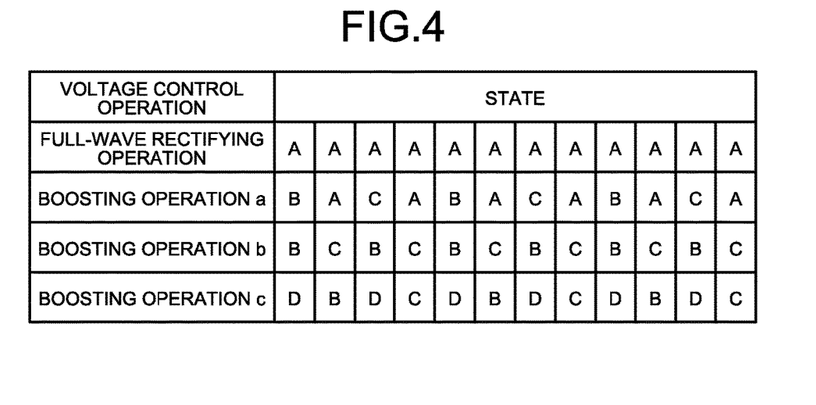
FIG. 4 is a diagram illustrating direct-current voltage control executed by the direct-current power supply device according to the first embodiment.

FIG. 4 is a diagram illustrating direct-current voltage control executed by the direct-current power supply device according to the first embodiment. The direct-current power supply device 100 according to the first embodiment executes one of four kinds of direct-current voltage control operations illustrated in FIG. 4 and supplies direct-current power to the load 9. As the direct-current voltage control operations executed by the direct-current power supply device 100, there are a full-wave rectifying operation in which the state A explained above is used and boosting operations "a" to "c" in which the states A to D are combined.

As the boosting operations, the boosting operation "a" in which an on-duty of the first switching element 4a and the second switching element 4b is smaller than 50%, the boosting operation "b" in which the on-duty of the first switching element 4a and the second switching element 4b is 50%, and the boosting operation "c" in which the on-duty of the first switching element 4a and the second switching element 4b is larger than 50%. The boosting operation "b" is a voltage doubling mode.

In the full-wave rectifying operation, by always setting the first switching element 4a and the second switching element 4b in an OFF-control state, a voltage full-wave rectified by the rectifier circuit 2 becomes an output voltage of the direct-current power supply device 100.

In the boosting operation "a", a simultaneous OFF period in which both of the first switching element 4a and the second switching element 4b are turned off, that is, the state A is provided. In the boosting operation "a", state transition of the states B→A→C→A is cyclically repeated. In the case of the boosting operation "a", the output voltage of the direct-current power supply device 100 is a voltage between an output voltage in the case of the full-wave rectifying operation and an output voltage in the case of the boosting operation "b".

In the boosting operation "b", which is the voltage doubling mode, OFF timing of the first switching element 4a and ON timing of the second switching element 4b are substantially the same time. The state B and the state C illustrated in FIG. 3 are repeated. In the case of the boosting operation "b", the output voltage of the direct-current power supply device 100 is approximately a double of the output voltage in the case of the full-wave rectifying operation. Note that, actually, a short-circuit current flows when the first switching element 4a and the second switching element 4b are simultaneously ON-controlled. Therefore, it is desirable to provide a dead time of approximately several microseconds.

In the boosting operation "c", a simultaneous ON period in which both of the first switching element 4a and the second switching element 4b are turned on, that is, the state D is provided. In the boosting operation "c", state transition of the states D→B→D→C is cyclically repeated. In this simultaneous ON period (a period of the state D), energy is accumulated in the reactor 3. In the case of the boosting operation "c", the output voltage of the direct-current power supply device 100 is a voltage equal to or higher than the output voltage in the case of the boosting operation "b".

In this way, the direct-current power supply device 100 according to this embodiment is capable of controlling the direct-current voltage supplied to the load 9 by changing the on-duty of the first switching element 4a and the second switching element 4b.

The direct-current power supply device 100 according to this embodiment is capable of performing the boosting operations "a" to "c". Therefore, it is possible to output a voltage higher than usual. When the load 9 is a constant power load, an electric current is halved and an electric current flowing to the load 9 is reduced when a voltage is doubled. Therefore, with the direct-current power supply device 100, it is possible to realize efficiency of an apparatus.

Charging frequencies of the first capacitor 6a and the second capacitor 6b in the boosting operations of the direct-current power supply device 100 according to this embodiment are explained with reference to FIG. 1. When a period obtained by combining a charging period and a non-charging period of a set of the first capacitor 6a and the second capacitor 6b, that is, a period obtained by combining an ON period and an OFF period of a set of the first switching element 4a and the second switching element 4b is represented as one cycle, the charging frequency of the first capacitor 6a and the second capacitor 6b indicates a switching frequency, which is the inverse of the one cycle. Note that, in the following explanation, in expression in which the first capacitor 6a and the second capacitor 6b are the subject, "charging frequency" is used for explanation. In expression in which the first switching element 4a and the second switching element 4b are the subject, "switching frequency" is used for explanation.

Figure 5:
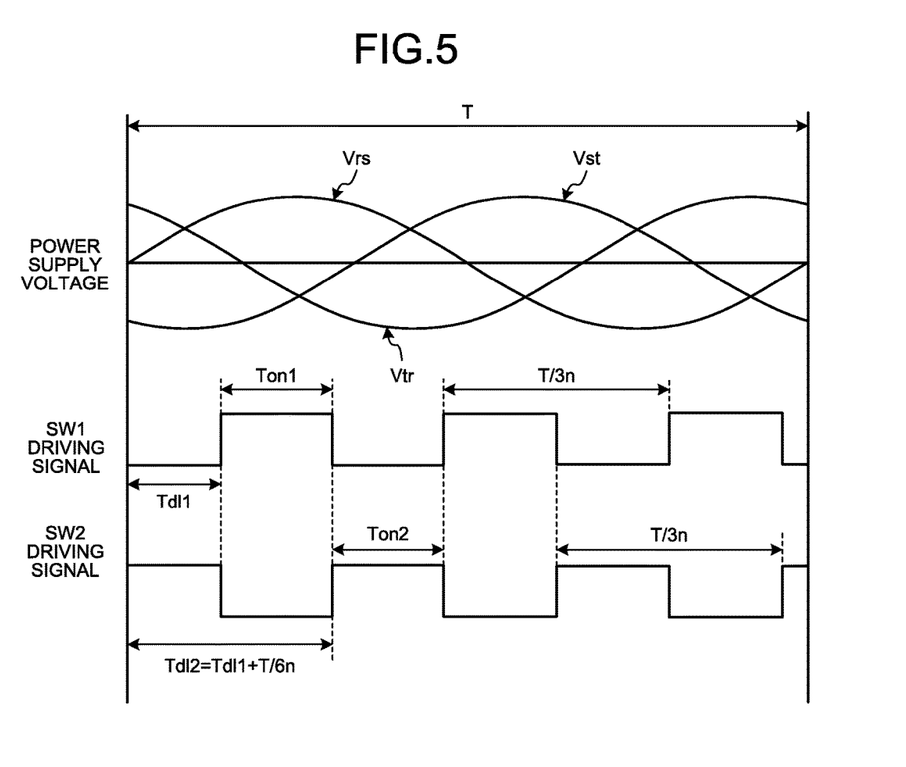
FIG. 5 is a diagram illustrating an operation waveform of the direct-current power supply device according to the first embodiment.

FIG. 5 is a diagram illustrating operation waveforms of the direct-current power supply device according to the first embodiment. In FIG. 5, waveforms (Vrs, Vst, and Vtr) of a power supply voltage, that is, a three-phase alternating current supplied from the alternating-current power supply 1, a waveform of a SW1 driving signal, which is a driving signal of the first switching element 4a, and a waveform of a SW2 driving signal, which is a driving signal of the second switching element 4b, are described. Td11 indicates an ON start phase of the first switching element 4a. Td12 indicates an ON start phase of the second switching element 4b.

In the direct-current power supply device 100 according to this embodiment, the charging frequency of the first capacitor 6a and the second capacitor 6b is controlled to be 3n times (n is a natural number) a frequency of a three-phase alternating current. That is, as illustrated in FIG. 5, a switching cycle is set to 1/3n times a cycle T of the three-phase alternating current. The first switching element 4a and the second switching element 4b are alternately ON-controlled at an ON time Ton1 and an ON time Ton2. In this way, distortion appearing in phase currents when the switching control is performed occurs in a phase equal to each of the phases. Therefore, waveforms of phase currents can be formed as similar shapes each shifting by 120 degrees with respect to a power supply cycle. Imbalance of the phase currents of the three-phase alternating current can be eliminated.

On the other hand, when the switching frequency is set to a frequency other than n times the frequency of the three-phase alternating current, the waveforms of the phase currents are not similar shapes and imbalance of the phase currents occurs. Similarly, when the switching control is performed in synchronization with the frequency of the three-phase alternating current, imbalance of the phase currents of the three-phase alternating current occurs.

That is, the switching of the first switching element 4a and the second switching element 4b is not performed at 3n times the frequency of the three-phase alternating current and the switching is performed in a different phase for each of the phases, imbalance of the phase currents occurs. Eventually, a distortion ratio of the phase currents increases and deterioration of a power factor and an increase in a harmonic current are caused.

In this embodiment, as explained above, the switching frequency of the first switching element 4a and the second switching element 4b, that is, the charging frequency of the first capacitor 6a and the second capacitor 6b is controlled to be 3n times the frequency of the three-phase alternating current. Consequently, the switching of the first switching element 4a and the second switching element 4b is performed in the same phase of the phases of the three-phase alternating current each shifting by 120 degrees with respect to the power supply cycle. Therefore, in both of the boosting operation "a" in which the simultaneous OFF period of the first switching element 4a and the second switching element 4b occurs and the boosting operation "c" in which the simultaneous ON period of the first switching element 4a and the second switching element 4b occurs, the waveforms of the phase currents of the three-phase alternating current are similar shapes. Therefore, imbalance of the phase currents does not occur. Eventually, the distortion ratio of the phase currents becomes a minimum value. It is possible to improve a power factor and prevent a harmonic current.

If n=1, that is, the first switching element 4a and the second switching element 4b are alternately ON-controlled at three times the frequency of the three-phase alternating current, a noise occurrence amount decreases. It is possible to reduce influence on other apparatuses connected to the same system.

50 hertz and 60 hertz are widely used as the power supply frequency. When it is necessary to properly use the frequencies according to a setting place, by providing a power-supply-voltage detecting unit (not illustrated in the figure) such as a sensor that detects a power supply voltage and detecting zero-cross timing of the power supply voltage, it is possible to grasp the frequency of the alternating-current power supply 1. By performing the switching operation at 3m times (m is a natural number) 300 hertz, which is the least common multiple of 50 hertz and 60 hertz, it is possible to eliminate imbalance of the phase currents without grasping the frequency of the alternating-current power supply 1. This contribute to a reduction in cost because it is unnecessary to provide the power-supply-voltage detecting unit.

Note that, in the case of the configuration illustrated in FIG. 2, that is, the direct-current power supply device 100a that converts a single-phase alternating current supplied from a single-phase power supply into a direct current, it is possible to prevent distortion of an electric current by performing the switching operation in one cycle of an alternating-current waveform in synchronization with a power supply frequency. 50 hertz and 60 hertz are widely used as the power supply frequency. By performing the switching operation at 300 hertz, which is the least common multiple of 50 hertz and 60 hertz, it is possible to eliminate imbalance of the phase currents without grasping the frequency of the alternating-current power supply 1.

An effect obtained by ON-controlling the first backflow preventing element 5a and the second backflow preventing element 5b in the states A to C illustrated in FIG. 3 is explained.

Figure 6:
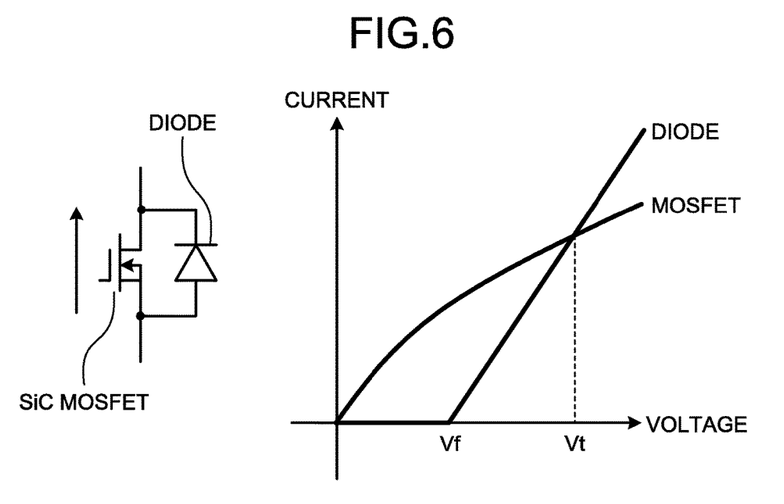
FIG. 6 is a diagram illustrating voltage-current characteristics of a MOSFET.

FIG. 6 is a diagram illustrating a voltage-current characteristic of a MOSFET and a voltage-current characteristic of a parasitic diode of the MOSFET or a diode externally attached to the MOSFET. When the diode, that is, the parasitic diode of the MOSFET or the diode externally attached to the MOSFET is used as a backflow preventing element, a voltage Vf until an electric current starts to flow is high. A loss represented by a product of the electric current and the voltage increases. In particular, in the state A illustrated in FIG. 3, because the electric current flows to the two backflow preventing elements, the loss in the diodes functioning as the backflow preventing elements cannot be neglected. To improve the loss, there is a method of using a diode having low Vf. However, an increase in cost is inevitable when the diode having the low Vf is used.

However, in the MOSFET, a voltage at which an electric current starts to flow is low compared with the diode. In particular, in a region where the electric current is low, the product of the electric current and the voltage, which is the loss, is small. Therefore, it is possible to further reduce a conduction loss than when the electric current is fed to the diode. It is possible to contribute to high efficiency of the direct-current power supply device. However, in a region where the voltage exceeds Vt as illustrated in FIG. 6, the loss is smaller when the electric current is fed to the diode. Therefore, in the region where the voltage exceeds Vt, the first backflow preventing element 5a and the second backflow preventing element 5b can be OFF-controlled to be controlled to be made conductive to the diode. That is, concerning the first backflow preventing element 5a and the second backflow preventing element 5b formed by the MOSFETs, the control unit 8 of the direct-current power supply device 100 can OFF-control the first backflow preventing element 5a when an applied voltage to the first backflow preventing element 5a exceeds Vt illustrated in FIG. 6 and OFF-control the second backflow preventing element 5b when an applied voltage to the second backflow preventing element 5b exceeds Vt. In this case, the control unit 8 OFF-controls the first backflow preventing element 5a when the applied voltage to the first backflow preventing element 5a satisfies a specified condition after charging of the first capacitor 6a is started and OFF-controls the second backflow preventing element 5b when the applied voltage to the second backflow preventing element 5b satisfies the specified condition after charging of the second capacitor 6b is started. Note that, when the OFF control of the backflow preventing elements is not performed in a region where the voltage exceeds Vt, an electric current divided into the MOSFET and the diode flows. Therefore, the OFF control does not have to be intentionally performed.

As the first backflow preventing element 5a and the second backflow preventing element 5b, an element configured by a MOSFET and a SiC (silicon carbide) of a super-junction structure that attracts attention as a high-efficiency device in recent years can be used. However, a parasitic diode of SiC has a deterioration phenomenon due to a crystal defect present in a substrate in which a forward direction voltage drop is increased by a constant current load. Therefore, it is desired not to feed an electric current to the parasitic diode.

Figure 7:
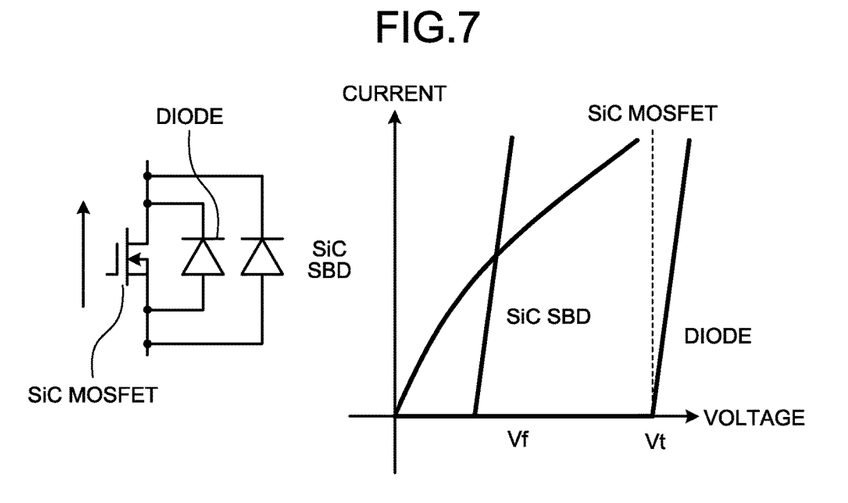
FIG. 7 is a diagram illustrating voltage-current characteristics of a SiC MOSFET and a SiC SBD.

Whereas a rising edge voltage of a parasitic diode of a SiC MOSFET is approximately 3 volts, a rising edge voltage of a SiC Shottky Barrier Diode (SBD) is as low as approximately 1 volt. Therefore, as illustrated in FIG. 7, by connecting the SiC SBD in parallel to the SiC MOSFET, it is possible to feed the electric current to the SiC SBD rather than the parasitic diode. It is possible to prevent deterioration of the parasitic diode. However, when a configuration is adopted in which the SiC SBD is connected in parallel to the SiC MOSFET, a problem such as a cost increase occurs.

Therefore, by adopting a configuration in which a voltage at ON time of the SiC MOSFET is low compared with the rising edge voltage of the parasitic diode and turning on the SiC MOSFET to perform a synchronous rectifying operation, the electric current flows to the SiC MOSFET side rather than the parasitic diode. Therefore, it is possible to prevent deterioration of the parasitic diode while preventing cost from increasing.

As explained above, the direct-current power supply device 100 according to this embodiment includes the first capacitor 6a and the second capacitor 6b connected in series between the output terminals to the load 9, the charging unit 7 that selectively charges one or both of the first capacitor 6a and the second capacitor 6b, and the control unit 8 that controls the charging unit 7. The charging unit 7 includes the first switching element 4a that switches charging and non-charging of the first capacitor 6a, the second switching element 4b that switches charging and non-charging of the second capacitor 6b, the first backflow preventing element 5a that prevents charged electric charges of the first capacitor 6a from backflowing to the first switching element 4a, and the second backflow preventing element 5b that prevents charged electric charges of the second capacitor 6b from backflowing to the second switching element 4b. The control unit 8 ON-controls the first backflow preventing element 5a when the first capacitor 6a is charged and ON-controls the second backflow preventing element 5b when the second capacitor 6b is charged. With the direct-current power supply device 100, it is possible to reduce a conduction loss of the first backflow preventing element 5a and the second backflow preventing element 5b. That is, it is possible to implement a high-efficiency direct-current power supply device. Note that the same effect can be obtained in the direct-current power supply device 100a illustrated in FIG. 2.

Second Embodiment

In a second embodiment, a refrigeration cycle-applied apparatus applied with the direct-current power supply device 100 described in the first embodiment is explained.

A more specific configuration of the refrigeration cycle-applied apparatus according to the second embodiment is explained with reference to FIG. 8.

Figure 8:
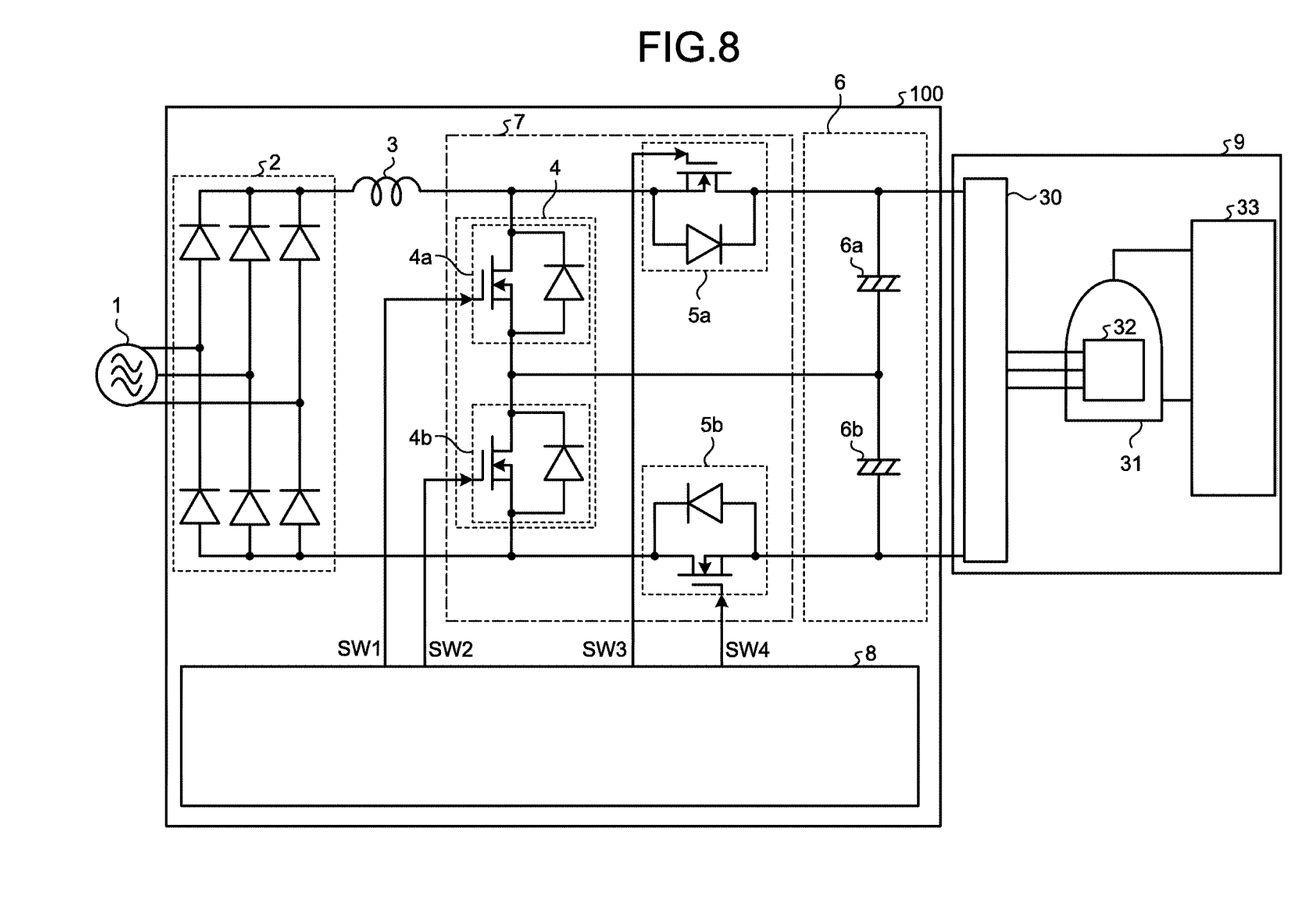
FIG. 8 is a diagram illustrating a configuration example of a refrigeration cycle-applied apparatus according to a second embodiment.

FIG. 8 is a diagram illustrating a configuration example of the refrigeration cycle-applied apparatus according to the second embodiment. As the refrigeration cycle-applied apparatus according to the second embodiment, for example, an air conditioner, a heat pump water heater, a refrigerator, and a freezer are assumed. In the example illustrated in FIG. 8, the load 9 connected to the direct-current power supply device 100 (see FIG. 1) explained in the first embodiment is a refrigeration air conditioner. The load 9 functioning as the refrigeration air conditioner includes an inverter 30, a compressor 31, a motor 32, and a refrigeration cycle 33.

The inverter 30 operates with a direct-current bus voltage (represented as Vdc) supplied from the direct-current power supply device 100 and a voltage Vdc/2 at a neutral point and drives the motor 32 incorporated in the compressor 31 at a variable speed and a variable voltage. The inverter 30 drives the motor 32 to thereby compress refrigerant in the refrigeration cycle 33 with the compressor 31 and operate the refrigeration cycle 33 to perform a desired operation such as cooling or heating.

With the refrigeration cycle-applied apparatus configured as illustrated in FIG. 8, it is possible to enjoy the effect obtained by the direct-current power supply device 100 explained in the first embodiment.

That is, the direct-current power supply device 100 ON-controls the first switching element 4a at Ton1 illustrated in FIG. 5 and ON-controls the second switching element 4b at Ton2 illustrated in FIG. 5 to control the direct-current bus voltage Vdc to a fixed value and supply the direct-current bus voltage Vdc to the load 9. As a result, it is possible to realize a stable operation of the load 9.

The direct-current power supply device 100 is capable of reducing a generation amount of harmonics (hereinafter referred to as harmonic generation amount) by controlling the ON start phase Td11 of the first switching element 4a and the ON start phase Td12 of the second switching element 4b. The harmonic generation amount needs to be reduced to an amount equal to or smaller than a standard value. The direct-current power supply device 100 includes the reactor 3 for the purpose of reducing the harmonics. The direct-current power supply device 100 is capable of reducing the harmonics generation amount by controlling Td11 and Td12 described above. Therefore, an amount of the harmonics reduced by the reactor 3 is reduced. Therefore, it is possible to realize a reduction in the size and the weight of the reactor 3. Note that the standard value of the harmonic generation amount is sometimes different according to countries, regions, and the like where the refrigeration cycle apparatus is used. When the refrigeration cycle apparatus is used in Japan, the standard value of the harmonic generation amount is specified by the Japanese Industrial Standards (JIS).

The direct-current power supply device 100 can reduce an input current during the same load by controlling the first switching element 4a and the second switching element 4b to achieve a high power factor. Further, the direct-current power supply device 100 can improve electric power supplied to the load 9. Therefore, it is possible to relatively increase the capacities of cooling and heating.

The refrigeration cycle-applied apparatus according to this embodiment applied with the direct-current power supply device 100 according to the first embodiment can also achieve an effect explained below.

Figure 9:
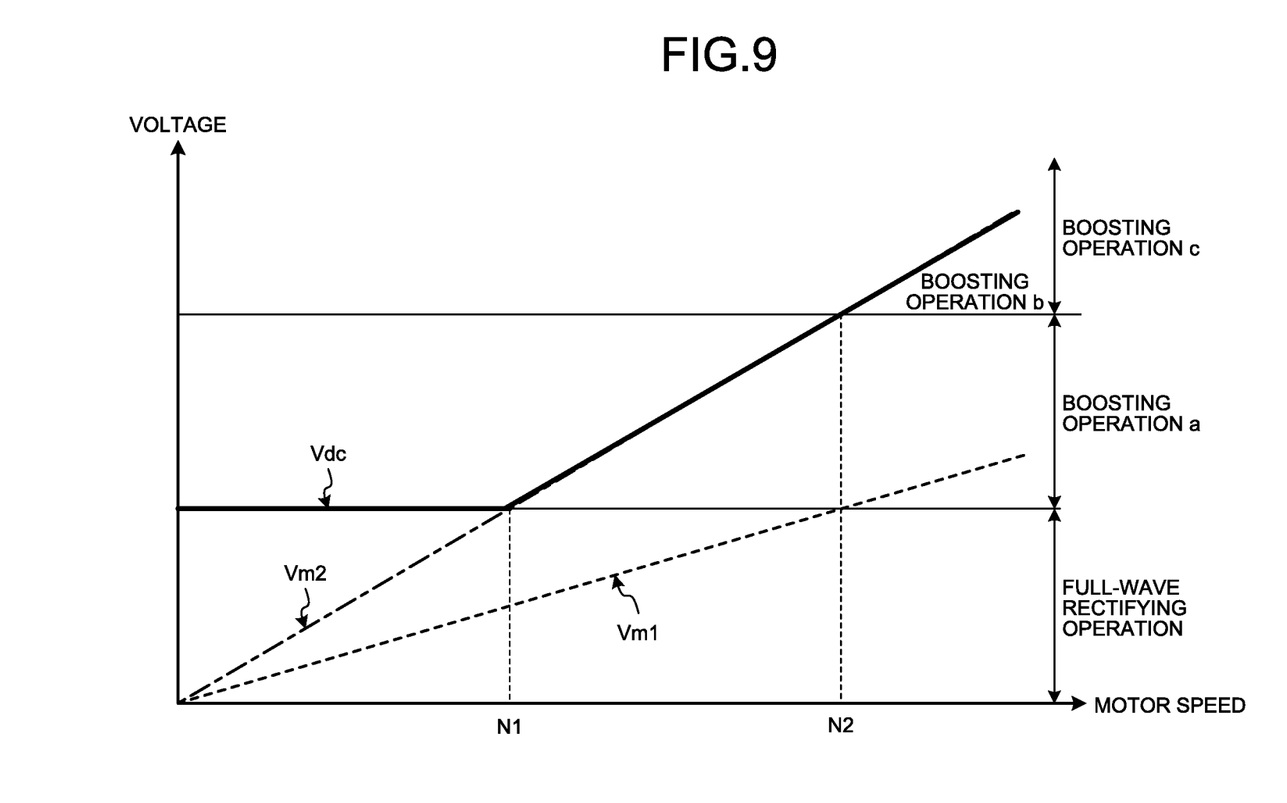
FIG. 9 is a diagram illustrating a relation between the rotating speed of a motor and a direct-current bus voltage in the refrigeration cycle-applied apparatus according to the second embodiment.

FIG. 9 is a diagram illustrating a relation between the rotating speed of the motor and the direct-current bus voltage Vdc in the refrigeration cycle-applied apparatus according to the second embodiment.

In general, the refrigeration air conditioner operates to improve a capacity when a difference between an actual temperature and a target temperature is large and operates to quickly bring the actual temperature close to the target temperature. At this time, the inverter 30 increases the rotating speed of the motor 32 and increases a refrigerant amount to be compressed by the compressor 31 to improve the capacity. A voltage value necessary for the driving of the motor 32 increases in proportion to the rotating speed of the motor 32 as illustrated in FIG. 9. When a motor having a low induced voltage is used as the motor 32, a characteristic is like a motor voltage Vm1 (a broken line illustrated in FIG. 9). When a motor having a high induced voltage is used as the motor 32, a characteristic is like a motor voltage Vm2 (an alternate long and short dash line illustrated in FIG. 9). When a motor having a high induced voltage is used as the motor 32, the motor can be driven by a smaller electric current because a voltage supplied from the inverter 30 increases. Therefore, a loss of the inverter 30 decreases and high-efficiency operation can be performed. However, when the direct-current power supply device 100 executes the full-wave rectifying operation, because the direct-current bus voltage Vdc is low, N1 is an upper limit value of a maximum rotating speed at which the high-efficiency operation is possible. At a rotating speed equal to or higher than the maximum rotating speed, operation is possible by using flux weakening control. However, efficiency is deteriorated because an electric current increases.

In the refrigeration cycle-applied apparatus including the direct-current power supply device 100 explained in the first embodiment, the direct-current bus voltage Vdc can be boosted by switching, according to an increase in the rotating speed of the motor 32, the direct-current voltage control operation of the direct-current power supply device 100 to the full-wave rectifying operation in a region where the rotating speed is up to N1, the boosting operation "a" in a region where the rotating speed is equal to or higher than N1 and lower than N2, the boosting operation "b" (the voltage doubling mode) in a region where the rotating speed is N2, and the boosting operation "c" in a region where the rotating speed is higher than N2. Therefore, it is possible to drive the motor 32 with high efficiency and at high speed. In a region where the rotating speed of the motor 32 is larger than N1, the direct-current bus voltage Vdc is controlled to be approximately Vm2, whereby the inverter 30 operates in a state of a high modulation ratio. Therefore, the number of switching pulses by Pulse Width Modulation (PWM) decreases. Therefore, it is possible to reduce a switching loss of the inverter 30 and a high-frequency iron loss of the motor 32 and realize high efficiency. When the direct-current power supply device 100 operates in the boosting operation "c", it is possible to output a voltage higher than the voltage in the boosting operation "b" (the voltage doubling mode). Therefore, it is possible to achieve an increase in an induced voltage by an increase in the number of windings of the motor 32 and realize high efficiency.

In the direct-current power supply device 100, the first switching element 4a and the second switching element 4b are controlled such that a bus voltage command value Vdc* (not illustrated in the figure) input to the control unit 8 and the direct-current bus voltage Vdc coincide. Therefore, by changing the bus voltage command value Vdc* according to the rotating speed of the motor 32 and electric power of the load, it is possible to operate the direct-current power supply voltage 100 with an optimum bus voltage Vdc adjusted to a load. It is possible to achieve a reduction in a loss of the inverter 30.

When the alternating-current power supply 1 is a three-phase power supply, by setting a switching frequency of the first switching element 4a and the second switching element 4b as explained below, it is possible to perform operation with the maximum efficiency without falling into overcurrent cutoff while minimizing an increase in the switching frequency. That is, in the full-wave rectifying operation and the boosting operation "a", by setting the switching frequency of the first switching element 4a and the second switching element 4b to three times the power supply frequency, it is possible to realize operation with the maximum efficiency without falling into overcurrent cutoff while minimizing an increase in the switching frequency. In the boosting operation "b" and the boosting operation "c", by setting the switching frequency of the first switching element 4a and the second switching element 4b to a frequency (e.g., 900 hertz) three times the least common multiple of 50 hertz and 60 hertz, it is possible to realize operation with the maximum efficiency without falling into overcurrent cutoff while minimizing an increase in the switching frequency.

In recent years, a shift from a motor in which an expensive and hardly stably supplied rare earth magnet such as neodymium (Nd) or dysprosium (Dy) is used to a motor in which the rare earth magnet is not used has been examined. However, efficiency deterioration and deterioration in demagnetization durability are problems. In the direct-current power supply device 100 explained in the first embodiment, it is possible to supplement the efficiency deterioration with an increase in the number of windings by boosting. Concerning the deterioration in the demagnetization durability, it is possible to achieve prevention of flux weakening control by boosting. Therefore, it is possible to use a stably suppliable and inexpensive motor as the motor 32.

As the power supply voltage of the alternating-current power supply 1, which is the power supply of the direct-current power supply device 100, there are various power supply voltages such as 200 volts and 400 volts. Therefore, there are a plurality of kinds of motor specifications when the motor 32 is designed according to power supply situations for each destination. An evaluation load and a development load of the motor 32 increase. In the direct-current power supply device 100 explained in the first embodiment, for example, the boosting operation "b" (the voltage doubling mode) is executed when the power supply voltage of the three-phase alternating current supplied from the alternating-current power supply 1 is 200 volts and the full-wave rectifying operation is executed when the power supply voltage of the three-phase alternating current is 400 volts. Consequently, the direct-current bus voltage Vdc is the same value when the power supply voltage of the three-phase alternating current is 200 volts and when the power supply voltage of the three-phase alternating current is 400 volts. Therefore, it is possible to implement, using a motor of the same specifications, refrigeration cycle-applied apparatus to destinations where power supply voltages of the three-phase alternating current are different. Further, when the full-wave rectifying operation is executed when the power supply voltage of the three-phase alternating current is 400 volts, the direct-current bus voltage Vdc fluctuates when the power supply voltage fluctuates. For example, when the direct-current bus voltage Vdc becomes lower than an assumed value when the full-wave rectifying operation is executed, by executing the boosting operation "a" to boost the direct-current bus voltage Vdc, it is possible to reduce influence due to the fluctuation in the power supply voltage. It is possible to operate the inverter 30 at a constant voltage. When the operation is switched between the boosting operation "b" and the boosting operation "a" to change the switching frequency, the switching frequency is switched between mutually shifted regions. Therefore, it is likely that the operation becomes unstable. In that case, it is possible to prevent the operation from becoming unstable by providing hysteresis or linearly changing a frequency (e.g., linearly increasing the frequency from 150 hertz to 900 hertz).

Further, when the alternating-current power supply 1 is a three-phase alternating-current power supply, in the boosting operations "a" to "c", the first switching element 4a and the second switching element 4b are alternately ON-controlled at 3n times the frequency of the three-phase alternating current. Consequently, waveforms of phase currents of the three-phase alternating current become similar shapes and imbalance of the phase currents does not occur. Eventually, a distortion ratio of the phase currents becomes a minimum value. It is possible to improve a power factor and reduce a harmonic current.

As explained above, with the refrigeration cycle-applied apparatus in the second embodiment, by configuring the refrigeration cycle-applied apparatus using the direct-current power supply device 100 described in the first embodiment, it is possible to enjoy the effect obtained by the direct-current power supply device 100 explained in the first embodiment. Note that the refrigeration cycle-applied apparatus including the direct-current power supply device 100 in which the alternating-current power supply 1 is the three-phase alternating-current power supply is explained. However, it is possible to enjoy the same effect in a refrigeration cycle-applied apparatus including the direct-current power supply device 100a in which the alternating-current power supply 1 is a single-phase alternating current power supply.

By switching the direct-current voltage control operation of the direct-current power supply device 100 to the full-wave rectifying operation, the boosting operation "a", the boosting operation "b" (the voltage doubling mode), and the boosting operation "c" according to an increase in the rotating speed of the motor, it is possible to drive the motor with high efficiency and at high speed.

The induced voltage by the increase in the number of windings of the motor increases and high efficiency can be achieved. Therefore, it is possible to use a stably suppliable and inexpensive motor.

It is possible to cope with different power supply voltages without changing motor specifications. Therefore, it is possible to reduce an evaluation load and a development load of the motor.

When the three-phase alternating current is supplied, in the boosting operations, the first switching element 4a and the second switching element 4b are switching-controlled at a switching frequency 3n times the frequency of the three-phase alternating current. Consequently, waveforms of phase currents of the three-phase alternating current become similar shapes and imbalance of the phase currents does not occur. Eventually, a distortion ratio of the phase currents becomes a minimum value. It is possible to improve a power factor and reduce a harmonic current.

In the embodiments explained above, in general, a Si-based semiconductor made of silicon (Si) is mainly used as the switching elements and the backflow preventing elements configuring the charging unit 7 of the capacitor. However, a wide bandgap (WBG) semiconductor made of silicon carbide (SiC), gallium nitride (GaN), or diamond can be used.

Switching elements and backflow preventing elements formed by such a WBG semiconductor have high Voltage resistance and have high allowable current density. Therefore, it is possible to reduce the size of the switching elements and the backflow preventing elements. By using the switching elements and the backflow preventing elements reduced in the size, it is possible to reduce the size of the direct-current power supply device configured using the elements.

The switching elements and the backflow preventing elements formed by such a WBG semiconductor have high heat resistance as well. Therefore, it is possible to reduce the size of a heat radiation fin of a heat sink and change a water cooling unit to air cooling. Therefore, it is possible to further reduce the size of the direct-current power supply device.

Further, the switching elements and the backflow preventing elements formed by such a WBG semiconductor have a low power loss. Therefore, it is possible to improve efficiency of the switching elements and the backflow preventing elements. Eventually, it is possible to improve efficiency of the direct-current power supply device.

Note that it is desirable that both of the switching elements and the backflow preventing elements are formed by the WBG semiconductor. However, either the switching elements or the backflow preventing elements can be formed by the WBG semiconductor. It is possible to obtain the effect explained above.

In the embodiments explained above, as the switching elements, for example, the power transistor, the power MOSFET, and the IGBT are described as the examples. However, it is possible to obtain the same effect when a MOSFET, an insulated gate semiconductor device, a bipolar transistor, and the like of a super-junction structure known as high-efficiency switching elements are used.

The control unit 8 of the direct-current power supply devices 100 and 100a can be configured by a discrete system of a Central Processing Unit (CPU), a Digital Signal Processor (DSP), or a microcomputer. However, besides, the control unit 8 can be configured by an electric circuit element such as an analog circuit or a digital circuit.

The configurations explained above in the embodiments indicate examples of the content of the present invention. The configurations can be combined with other publicly-known technologies. A part of the configuration can be omitted or changed in a range not departing from the spirit of the present invention.

The invention claimed is:

1. A direct-current power supply device that converts an alternating current into a direct current and supplies the direct current to a load, the direct-current power supply device comprising:
a first capacitor and a second capacitor connected in series between output terminals to the load;
a charger including a first switcher to switch charging and non-charging of the first capacitor, a second switcher to switch charging and non-charging of the second capacitor, a first backflow preventer to prevent charged electric charges of the first capacitor from backflowing to the first switcher, and a second backflow preventer to prevent charged electric charges of the second capacitor from backflowing to the second switcher; and
a controller to control the first backflow preventer to an ON state at timing when the charging of the first capacitor is started and control the second backflow preventer to the ON state at timing when the charging of the second capacitor is started,
wherein the controller controls the first backflow preventer to the ON state when an applied voltage to the first backflow preventer is equal to or less than a predetermined voltage value after the charging of the first capacitor is started and controls the second backflow preventer to the ON state when an applied voltage to the second backflow preventer is equal to or less than the predetermined voltage value after the charging of the second capacitor is started.

2. The direct-current power supply device according to claim 1, wherein the controller controls the first switcher, the first backflow preventer, the second switcher, and the second backflow preventer such that a state of the first switcher and a state of the first backflow preventer are opposite to each other and a state of the second switcher and a state of the second backflow preventer are opposite to each other.

3. The direct-current power supply device according to claim 2, wherein the first backflow preventer and the second backflow preventer are formed by a MOSFET.

4. A refrigeration cycle-applied apparatus comprising the direct-current power supply device according to claim 3.

5. The direct-current power supply device according to claim 2, wherein the first backflow preventer and the second backflow preventer are formed by a MOSFET and a diode connected in antiparallel to the MOSFET.

6. A refrigeration cycle-applied apparatus comprising the direct-current power supply device according to claim 5.

7. The direct-current power supply device according to claim 2, wherein at least one of the first switcher, the second switcher, the first backflow preventer, and the second backflow preventer is formed by a wide bandgap semiconductor.

8. A refrigeration cycle-applied apparatus comprising the direct-current power supply device according to claim 7.

9. A refrigeration cycle-applied apparatus comprising the direct-current power supply device according to claim 2.

10. The direct-current power supply device according to claim 1, wherein the first backflow preventer and the second backflow preventer are formed by a MOSFET.

11. A refrigeration cycle-applied apparatus comprising the direct-current power supply device according to claim 10.

12. The direct-current power supply device according to claim 1, wherein the first backflow preventer and the second backflow preventer are formed by a MOSFET and a diode connected in antiparallel to the MOSFET.

13. A refrigeration cycle-applied apparatus comprising the direct-current power supply device according to claim 12.

14. The direct-current power supply device according to claim 1, wherein at least one of the first switcher, the second switcher, the first backflow preventer, and the second backflow preventer is formed by a wide bandgap semiconductor.

15. A refrigeration cycle-applied apparatus comprising the direct-current power supply device according to claim 14.

16. A refrigeration cycle-applied apparatus comprising the direct-current power supply device according to claim 1.

* * * * *